Nov. 14, 1961 R. L. BROWNLEE ET AL 3,008,282
RIDING SUPPORTS FOR MOWERS AND THE LIKE
Filed April 22, 1959 3 Sheets-Sheet 1

INVENTORS:
ROBERT L. BROWNLEE
NORMAN F. SWANSON
BY
Stevens & Batchelor
ATTORNEYS.

Nov. 14, 1961 R. L. BROWNLEE ET AL 3,008,282
RIDING SUPPORTS FOR MOWERS AND THE LIKE
Filed April 22, 1959 3 Sheets-Sheet 2
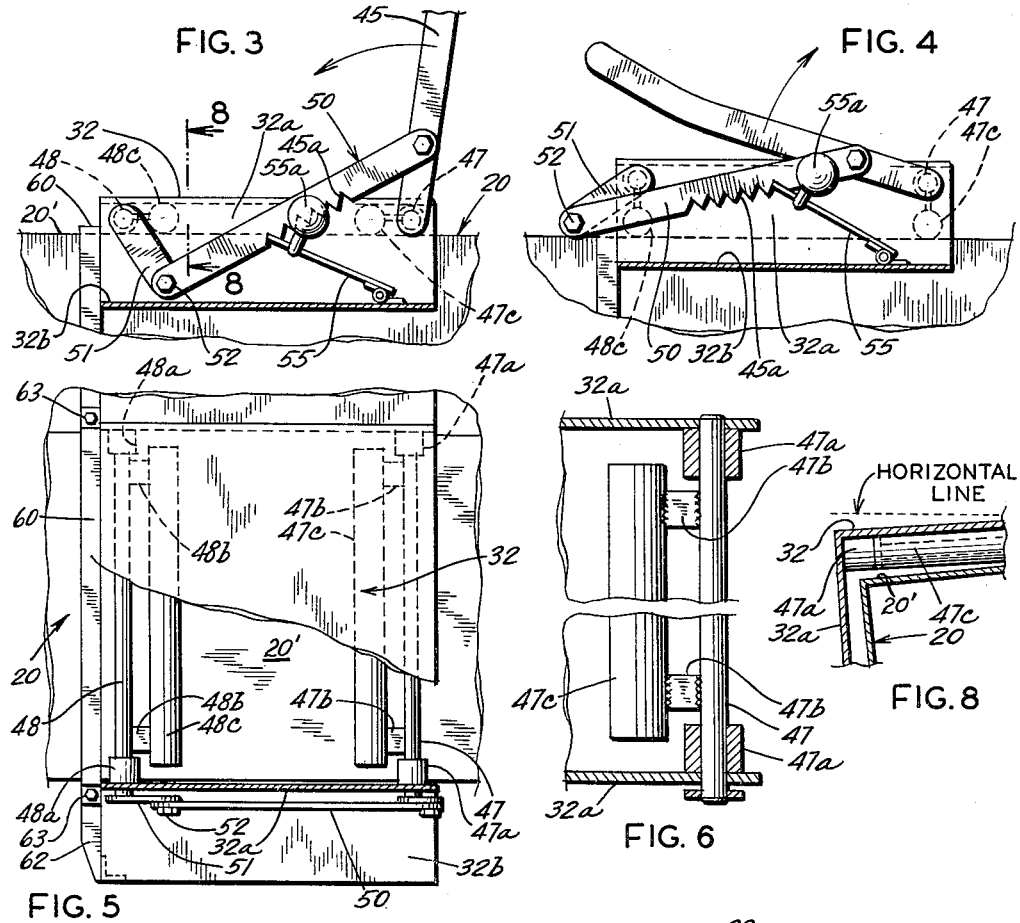
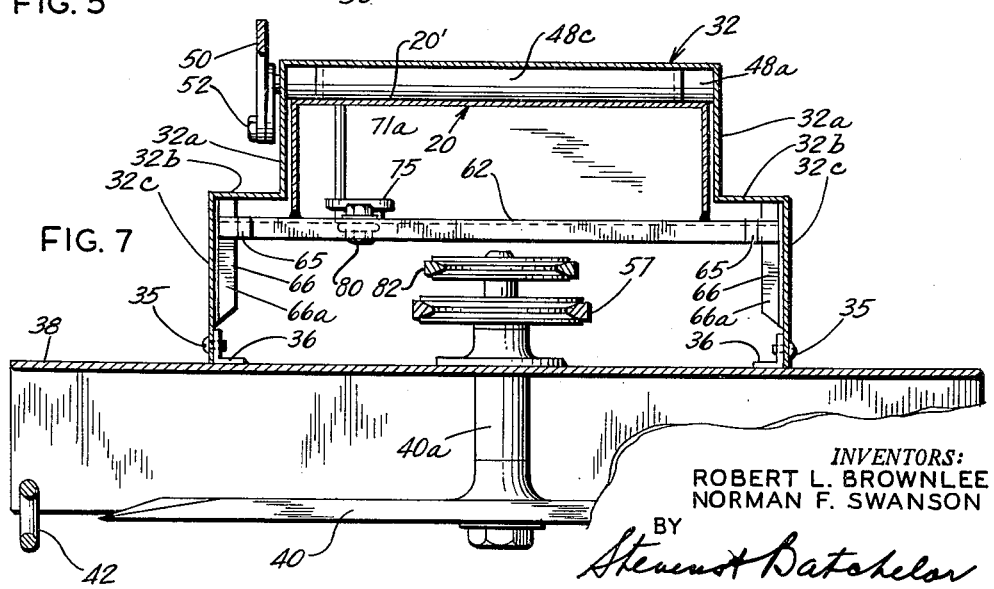
INVENTORS:
ROBERT L. BROWNLEE
NORMAN F. SWANSON
BY
Stevens & Batchelor
ATTORNEYS.

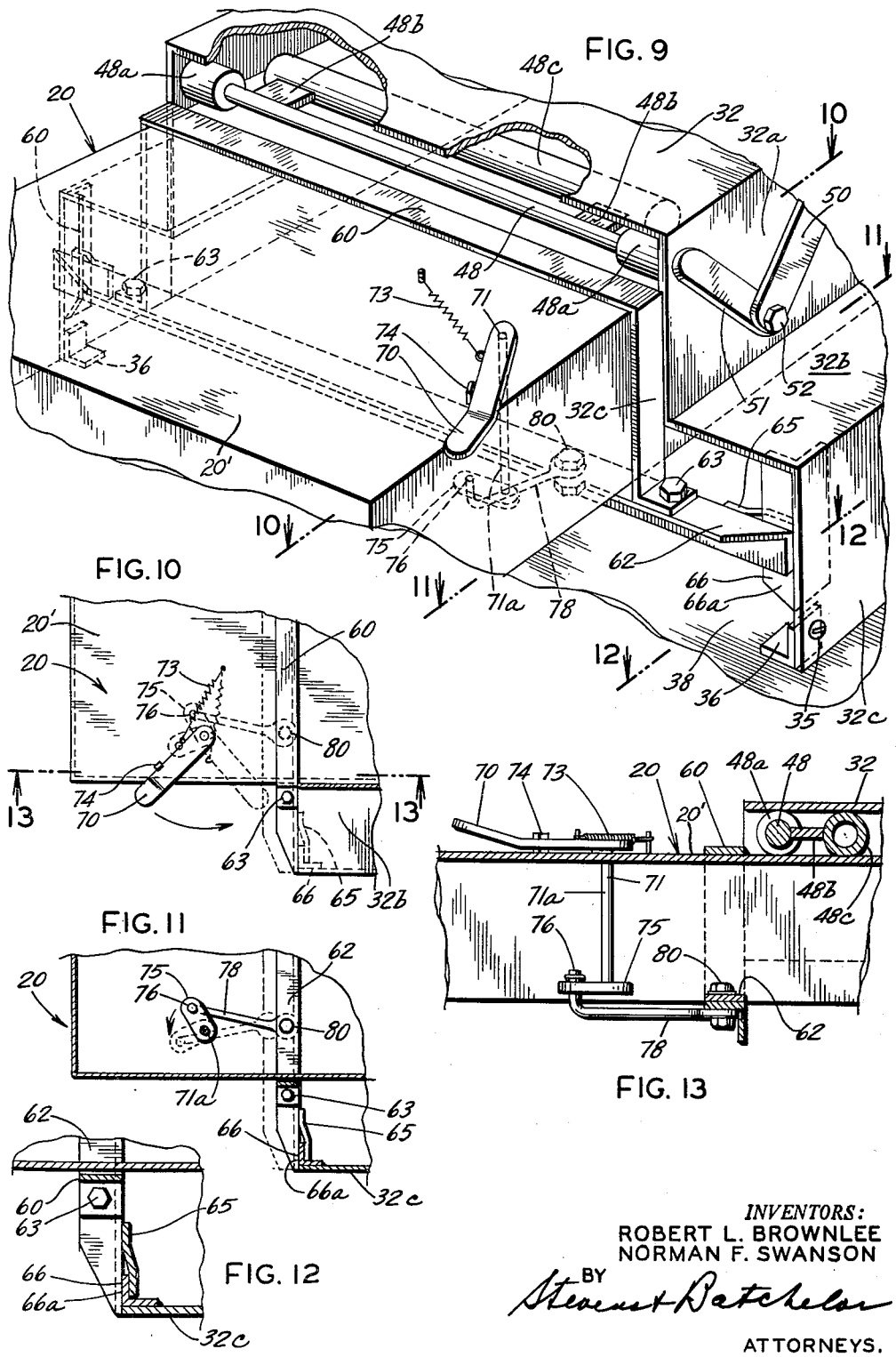

United States Patent Office 3,008,282
Patented Nov. 14, 1961

3,008,282
RIDING SUPPORTS FOR MOWERS AND THE LIKE
Robert L. Brownlee, Wolf Road S., Mokena, Ill., and
Norman F. Swanson, R.R. 1, Warrenville, Ill.
Filed Apr. 22, 1959, Ser. No. 808,132
5 Claims. (Cl. 56—25.4)

Our invention relates to lawn working machines, and more particularly to the riding type which may carry a mowing, plowing, cultivating or other operative unit. While the specification refers primarily to riding type mowers, it is to be understood that this is merely by way of example, and in no manner construed as a limitation. Heretofore it has been the practice in the design of mowers, particularly those of the rotary blade type, to rigidly secure the mower unit to the frame of the tractor. While this type of construction is satisfactory in some instances, it does have several disadvantages which seriously handicap its use. Thus, when one wheel of the vehicle falls into a hole or other ground depression, the mower blade follows suit, and digs through the soil below, scattering it and tearing the vegetation; or if the soil is hard or the vegetation thick, the blade is stopped, imposing a strain on the power drive.

Incidents of the above nature occur because the mower blade, by being carried rigidly by the vehicle, is subjected to the rise and fall of the terrain as the wheels of the vehicle roll over it. To guard the mower blade against engaging the ground or vegetation in case the vehicle wheels roll over uneven ground, the cutter blades of a power mower in Patent No. 2,870,592 of Norman F. Swanson are carried by a platform having pendent runners at the sides, such runners supporting the blades above the ground in case the vehicle wheels drop into ground depressions. The present invention also employs this principle, but has for one of its objects to include a saddle-like member which is non-rigidly supported on the mower frame and which supports the mower blades. As a result of this construction the blades may be readily moved relative to the frame both longitudinally and vertically thereof.

A further object is to design a saddle by means of which the mower blades may be sustained from falling to a level at which they would scalp the ground or otherwise damage the turf. Many of the prior art devices embodying the rigid connection between the frame and the implement allowed the blades of the latter to contact the ground when the wheels supporting the former encountered an irregularity such as a depression. By combining the saddle member with downwardly depending runners or skids which are adapted to engage the ground whenever such an irregularity is encountered, the blades are never permitted to contact the ground. The frame at the same time, due to non-rigid connection, is permitted to follow the contour of the supporting surface notwithstanding the engagement of the ground by the runners. This relationship directly results in another important feature characterized by the wheels being in full contact with the ground so there is little or no loss of traction even though the runners are in ground engaging position.

A further object is to include means in the saddle structure for raising and lowering the saddle, in order that side runners by the same may be positioned at a desired height.

An important object is to design the saddle to permit the replacement of any operative unit carried by it by a different type of unit or the removal of the operative unit when the use of the vehicle without it is desired.

A still further object is to provide a power drive in which the implement may be moved between driving engagement and disengagement with the power source carried on the frame. For example, the saddle member may be oscillated along the frame so as to tighten or loosen a belt drive connecting the power source with the implement. As a result, the need for a specific clutching apparatus, normally required in conventional mowers is eliminated.

An additional object is to provide means whereby the mower blades may readily be vertically adjusted with respect to the frame to provide cutting levels of varying heights as will be more fully described hereinafter.

FIG. 3 is an enlarged repetition of a mechanism in the center of FIG. 1, where the saddle and a rotary blade mower are mounted in the lowermost working position;

FIG. 4 is a view similar to FIG. 3, where the same parts are raised by a lifting device to the uppermost working position;

FIG. 5 is a top plan view of the showing in FIG. 3, partly broken away;

FIG. 6 is a sectional enlargement of a lifting device shown in the right-hand portion of FIG. 5;

FIG. 7 is an enlarged section on the line 7—7 of FIG. 1, partly broken away;

FIG. 8 is an enlarged fragmental cross-section, such as on the line 8—8 of FIG. 3, showing the relation of the vehicle frame, as tilted to one side, to the lifting device as shown;

FIG. 9 is an enlarged perspective view of the middle portion of the machine, looking in forward direction from the right, and showing parts normally hidden from view;

FIGS. 10 to 12 are sections on the lines 10—10 to 12—12 of FIG. 9;

FIG. 13 is a section on the line 13—13 of FIG. 10;

Figure 1:
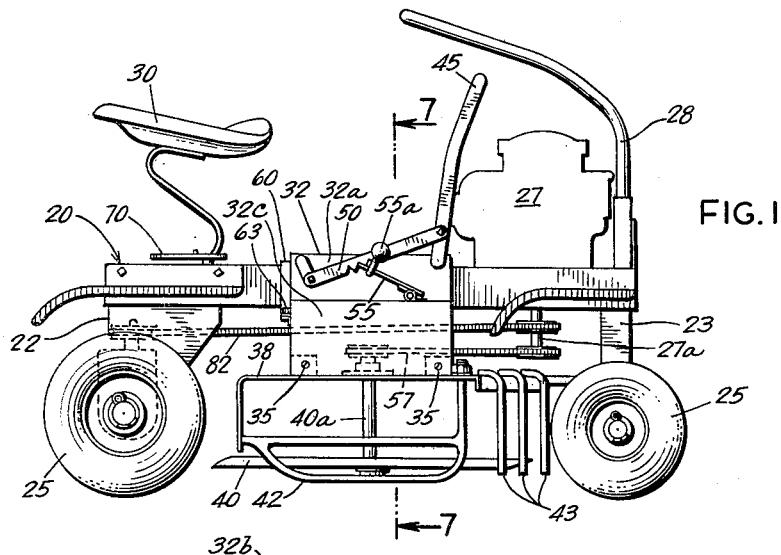
FIG. 1 is a side elevation of the vehicle as equipped with the novel saddle.

Referring specifically to the drawings, 20 denotes the frame of the vehicle, which includes a planar upper surface portion 20' and is supported by end pieces 22 and 23 on wheels 25. The forward part of the frame receives the power plant 27 and a steering post 28, while the seat 30 for the rider is mounted on the rear portion of the frame.

The operative unit, i.e., tool means such as a power mower, sickle, plow or other appliance is not carried directly by the frame, but by a saddle 32 of inverted-U shape, the saddle straddling the frame in the center, as shown in FIG. 1. The sides 32a of the saddle are formed with outward offsets 32b and terminates with skirt portions 32c. As shown in FIG. 7, bolts 35 from the skirt portions extend into angle lugs 36 carried by a hood 38 which constitutes the frame or housing of the operative unit, such as the rotary blade mower 40 shown. Thus, uncoupling the bolts 35 makes it possible to lower and remove the mower unit from the machine for replacement by a different type of unit.

Figure 2:
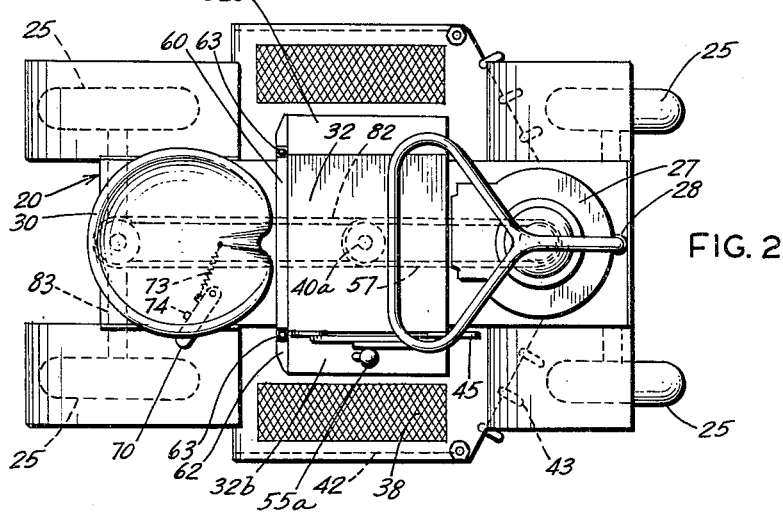
FIG. 2 is a top plan view.

As seen in FIGS. 1 and 2, the hood 38 carries pendent guard runners 42 on the sides and vertical guard rods 43 in front; and when the saddle rests squarely over the frame 20 as illustrated in FIG. 7, the machine carries the operative unit at its lowest level, such as for cutting short grass. It is desirable that the height of the mower be adjustable to cut at higher levels, and a mechanism is therefore provided for raising the saddle accordingly, such mechanism originating with a hand lever 45 rising from the right-hand frontal portion of the saddle, as shown in FIGS. 1 and 3.

FIG. 6 shows that the bottom portion of the hand lever 45 is attached to a horizontal cross-shaft 47 which is journaled in the sides 32a of the saddle near the top thereof; and the cross-shaft carries cylindrical collars 47a inwardly of the sides 32a. Between these the cross-shaft carries rearwardly directed strips 47b holding a cylindrical bar 47c. While the assembly of the cross-shaft 47 with the parts extended from it occurs in the front of the saddle, a similar assembly occurs in symmetrical relation in the rear thereof. FIGS. 5, 7, 8 and 9 show the cross-shaft in this assembly at 48 and its collars at 48a; and the strips 48b and bar 48c of the assembly extend in forward direction.

Figure 14:
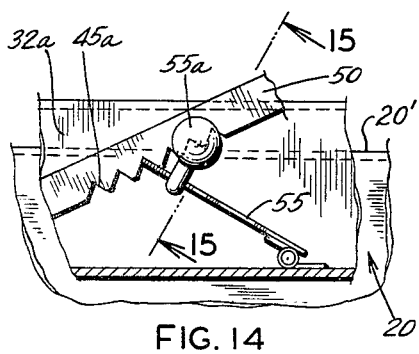
FIG. 14 is an enlarged view of a lifting control shown in FIG. 3, as adjusted to a medial position.
Figure 15:
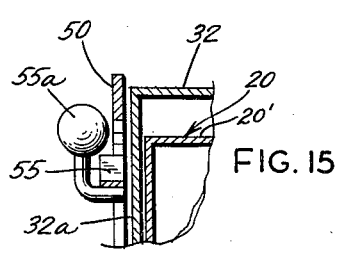
FIG. 15 is a section on the line 15—15 of FIG. 14.

The hand lever 45 operates the cross-shaft 48 through a long link 50 intermediately pivoted on lever 45 at one end, and pivoted at 52 on a short link 51 fixed on the end of shaft 48. When the saddle 32 is in the lowermost position, the hand lever and links are positioned as in FIG. 3, the corresponding position of the internal bars 47c and 48c being indicated by dotted lines. The same position of the bar 48c is also shown in FIGS. 5, 7, 8, 9, and 13. However, when the hand lever is drawn rearwardly in the direction of the curved arrow in FIG. 3, the bars 47c and 48c will be swung down to bear on the machine frame 20, this action serving to lift the saddle, so that the same is at its highest level when the hand lever has been swung to the position of FIG. 4. It is noted from FIG. 3 that a spring detent 55 mounted on the right-hand saddle offset 32b is directed into the first in a series of notches 45a in the bottom of the hand lever 45 to normally check the hand lever from backing motion; and a hand knob 55a carried by the detent is used to set the detent in the notch corresponding to the chosen height-adjustment of the saddle, the setting of the detent for the maximum height being illustrated in FIG. 4. A medial setting is shown in FIGS. 14 and 15.

The mower 40 is connected to the power plant 27 by a simple horizontal belt drive 57. FIGS. 1 and 7 show that this drive extends from the shaft 27a of the power plant to the upper end portion of the mower shaft 40a. As indicated in FIG. 7, the saddle supports the mower. When the saddle is in a position to keep the belt 57 slack, no drive will be transmitted to the mower; and drawing the saddle rearwardly a short distance will tighten the belt and induce the operation of the mower. A device securing a hold on the saddle for this purpose is provided in the form of a slide 60 seen more clearly in FIGS. 9 and 13. The slide is a cross-bar which straddles the machine frame immediately behind the saddle and has a bottom angle bar 62 bolted to it at 63. The angle bar receives a side piece 65 at each end forming a fork which straddles the rear flange 66a of an angle plate 66 secured on the inner side of the correspondingly positioned saddle skirt portion 32c. Thus, when the slide 60 is moved rearwardly, it will draw on the saddle whatever the adjusted height of the same may be.

A control designed to draw rearwardly on the slide 60 is illustrated in FIGS. 9 to 11, and 13. Thus, a horizontal hand lever 70 is pivoted at 71 on the frame 20 for motion between the full and dotted line positions indicated in FIG. 10. When the lever is in the full-line position, a spring 73 draws it on one side of the pivot to abut a stop lug 74 mounted on the frame. When the lever is swung to the dotted line position, it is retained against returning by the swing of the spring 73 to the other side of the pivot.

As seen in FIG. 13, the pivot 71 depends in the form of a vertical shaft 71a to a point opposite the angle bar 62. Here FIG. 11 shows that the shaft 71a carries one end of a lug 75, the other end of which is pivoted at 76 to the rear end of a link 78. The forward end of the latter extends underneath the angle bar 62 and is pivoted on a bolt 80 carried by the same.

Full lines in FIG. 11 indicate the saddle in the forward position while the machine is not in use, the drive belt 57 being loose in such event. When the saddle is to be backed for tightening the drive belt, the hand lever 70 is swung to the dotted-line position. This action rotates the lug 75 in the direction of the arrow as seen in FIG. 11, drawing the slide to the dotted-line position of FIG. 11 and the saddle rearwardly. When the hand lever reaches the dotted-line position of FIG. 10 the lug 75 reaches the dotted-line position of FIG. 11, where the link 78 has swung to the other side of the lug pivot to aid in retaining the slide in the rearward position.

It is now apparent, on putting the vehicle in motion, such as by means of a belt drive 82 from the power plant to the rear axle 83, that the operation of the mower is induced by swinging the hand lever 70 forwardly. It is assumed that the mower has been set to the desired height by adjusting the hand lever 45 accordingly. The normal progress of the machine will now ensue, until one of the wheels 25 meets a ground depression. In such event the frame 20 will tilt on the corresponding side, as shown in FIG. 8. The tendency will be for the saddle to follow the tilt of the frame, as indicated in the same figure, although there is no positive means to induce such action. However, the correspondingly-located runner 42, which travels at a level lower than the mower blade 40 will meet the ground and stop the continued tilt of the saddle, preventing the mower blade from engaging the ground. Thus, the tilt of the vehicle to a point where the mower blade would ordinarily engage the ground with damaging or stopping effect leaves the blade at a safe height in the present case.

It is also probable that the vehicle will encounter high spots in the terrain, and particularly humps or roots when passing trees. FIG. 2 shows that the hood 38 projects laterally from the vehicle wheels, placing the correspondingly-located runner 42 where it will be lifted by the ground obstruction. Since the mower blade is higher than the runner, it will of course clear the obstruction as the runner rides over it.

It will now be apparent that the novel saddle is a center unit for the vehicle which is self-adjusting to keep the mower blade or other implement carried by it from interfering with or becoming snagged by soil or vegetation when the vehicle encounters a low or high spot in the terrain. Further, the saddle needs no mechanism for a power drive to the implement carried by it, a simple belt drive serving the purpose with inherent flexibility and the facilitiy of coupling and disconnecting the drive quickly. Further, the free mounting of the saddle adapts it for controlling the mower drive by the mere movement of the saddle in forward or rearward direction to loosen or tighten the belt drive from the power unit. Finally, the saddle is constructed in a manner to make its ground working unit interchangeable, or entirely removable from the vehicle in case the use of the latter alone or with a different accessory is desired.

While we have described the invention along specific lines, various minor changes or refinements may be made therein without departing from its principle, and we reserve the right to employ all such changes and refinements as may come within the scope and spirit of the appended claims.

We claim:

1. An agricultural implement comprising a mobile frame, a transversely disposed generally inverted U-shaped saddle on said frame, said saddle having terminal leg portions, runner means on said leg portions, said saddle and said frame having cooperating vertical guide means permitting relative vertical movement of said saddle with respect to said frame, agricultural tool means on said saddle, motor means on said frame and flexible drive means between said motor and said tool.

2. The structure of claim 1; said flexible drive means comprising an endless belt drive.

3. The structure of claim 1; said tool means being detachably mounted on said saddle to permit replacement and interchanging of the same.

4. The structure of claim 1; and force transmitting means interposed between said saddle and said frame for adjusting the normal relative relation of the saddle and tool means with respect to a support surface for said mobile frame.

5. The structure of claim 4; said frame including a planar upper surface portion, said saddle including a planar portion overlying the planar portion of said frame, said force transmitting means comprising a pair of vertically pivotal bars mounted on said saddle and engageable on the planar surface of said frame, and adjustable lever means connected to said bars for vertically pivoting the same to a predetermined position.

References Cited in the file of this patent

UNITED STATES PATENTS

| | | |
|---|---|---|
| 2,576,886 | McCoy | Nov. 27, 1951 |
| 2,791,079 | Funk | May 7, 1957 |
| 2,857,726 | Smith | Oct. 28, 1958 |
| 2,862,343 | Wood | Dec. 2, 1958 |
| 2,911,781 | Baehr | Nov. 10, 1959 |
| 2,949,004 | Jones | Aug. 16, 1960 |